(12) United States Patent
Lipski, Jr.

(10) Patent No.: US 12,548,665 B1
(45) Date of Patent: Feb. 10, 2026

(54) SENSOR-BASED IoT MEDICAL INSTRUMENT USE, STERILIZATION, AND INVENTORY TRACKING SYSTEM

(71) Applicant: Charles Joseph Lipski, Jr., Denver, CO (US)

(72) Inventor: Charles Joseph Lipski, Jr., Denver, CO (US)

( * ) Notice: Subject to any disclaimer, the term of this patent is extended or adjusted under 35 U.S.C. 154(b) by 6 days.

(21) Appl. No.: 18/656,324

(22) Filed: May 6, 2024

(51) Int. Cl.
| | | |
|---|---|---|
| *G16H 40/20* | (2018.01) | |
| *G16Y 20/10* | (2020.01) | |
| *G16Y 40/10* | (2020.01) | |

(52) U.S. Cl.
CPC ............ *G16H 40/20* (2018.01); *G16Y 20/10* (2020.01); *G16Y 40/10* (2020.01)

(58) Field of Classification Search
CPC ......... G16H 40/20; G16Y 20/10; G16Y 40/10
See application file for complete search history.

(56) References Cited

U.S. PATENT DOCUMENTS

| | | | | |
|---|---|---|---|---|
| 12,239,753 | B2 * | 3/2025 | Paul | ............ A61L 2/085 |
| 2023/0360788 | A1 * | 11/2023 | Suzuki | ............ G06T 7/62 |

OTHER PUBLICATIONS

Krichen, 2020, pp. 2997-3011.*
Gupta, Elsevier, 2020, pp. 1-26.*
Alam, 2022, pp. 1-11.*

* cited by examiner

*Primary Examiner* — Michael I Ezewoko
(74) *Attorney, Agent, or Firm* — Plager Schack LLP; Mark H. Plager; Stephen Hallberg

(57) ABSTRACT

A sensor-based IoT medical (surgical, dental, etc.) instrument use, sterilization, and inventory tracking system is disclosed. The sensor-based IoT medical (surgical, dental, etc.) instrument use, sterilization, and inventory tracking system tracks usage, sterilization, and inventory of surgical medical tools and instruments, dental tools and instruments, and other medical tools and instruments. In some embodiments, the sensor-based IoT medical instrument use, sterilization, and inventory tracking system is connected to a cloud application service with a cloud database to store all tracked usage, sterilization, and inventory data for the medical tools and instruments.

10 Claims, 3 Drawing Sheets

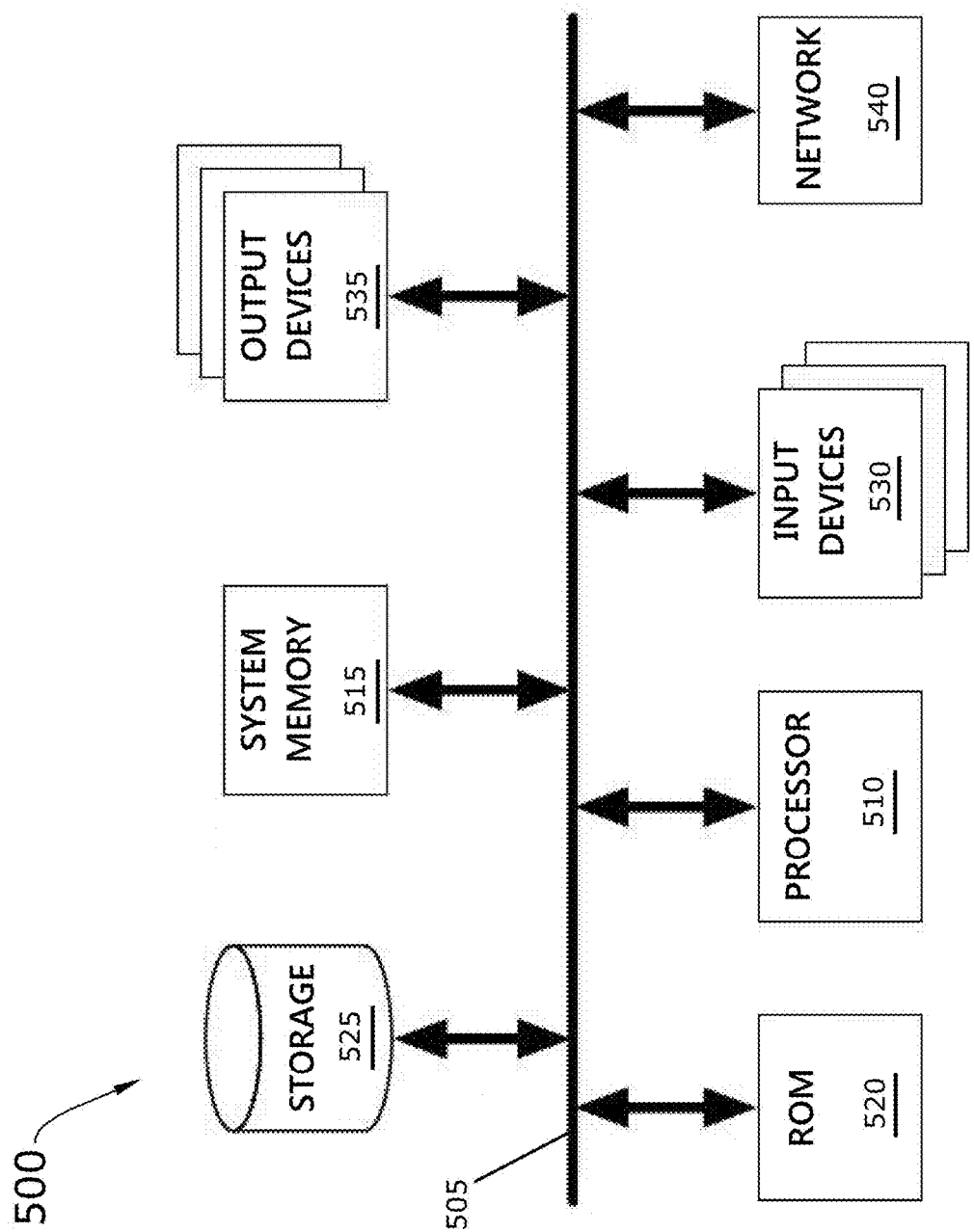

SENSOR-BASED IoT MEDICAL INSTRUMENT USE, STERILIZATION, AND INVENTORY TRACKING SYSTEM

BACKGROUND

Embodiments of the invention described in this specification relate generally to tracking surgical tools and operating room tools, and more particularly, to a sensor-based IoT medical (surgical, dental, etc.) instrument use, sterilization, and inventory tracking system.

In a typical surgery, there are so many surgical tools and instruments that may be used that a very accurate inventory is required to avoid issues. The problem is having so many surgical instruments used in average surgery, or even just available for possible usage when not actually used, and no automated way to do inventory control.

There is currently a manual tracking method. However, the manual tracking method is prone to human error. This leads to problems when, for example, a surgical tool is need for a particular surgery, the inventory system indicates that at least one of the surgical tools is available for use, but in fact, there is no such tool currently available when the surgery starts. As one might imagine, this is a problem for medical practitioners, such as surgeons, as well as the patients who are undergoing the surgery or medical procedure.

Therefore, what is needed is a way to augment the manual tracking method by creating a digital inventory of all instruments to be used in effective tracking and inventory.

BRIEF DESCRIPTION

Some embodiments of the invention include a novel sensor-based IoT medical (surgical, dental, etc.) instrument use, sterilization, and inventory tracking system. In some embodiments, the sensor-based IoT medical (surgical, dental, etc.) instrument use, sterilization, and inventory tracking system tracks usage, sterilization, and inventory of surgical medical tools and instruments, dental tools and instruments, and other medical tools and instruments. In some embodiments, the sensor-based IoT medical instrument use, sterilization, and inventory tracking system is connected to a cloud application service with a cloud database to store all tracked usage, sterilization, and inventory data for the medical tools and instruments.

In some embodiments, the sensor-based IoT medical instrument use, sterilization, and inventory tracking system comprises (i) a plurality of IoT connection devices that attach to medical instruments to track, (ii) an antenna embedded within each IoT connection device, (iii) an RFID chip embedded within each IoT connection device, (iv) a sensor embedded within each IoT connection device, (v) a bio-sealant that hermetically encapsulates the IoT connection device attached to any surgical tool, (vi) a gateway that is communicably connected to the Internet and to which the plurality of IoT connection devices connect to track medical instrument and tool usage, sterilization, and inventory, (vii) a cloud application service that provides a cloud platform for tracking medical instrument and tool usage, sterilization, and inventory, and (viii) a software application that runs on one of a computing device and a mobile device to provide a visual display of tracked information for medical tools and instruments.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments.

Figure 1:
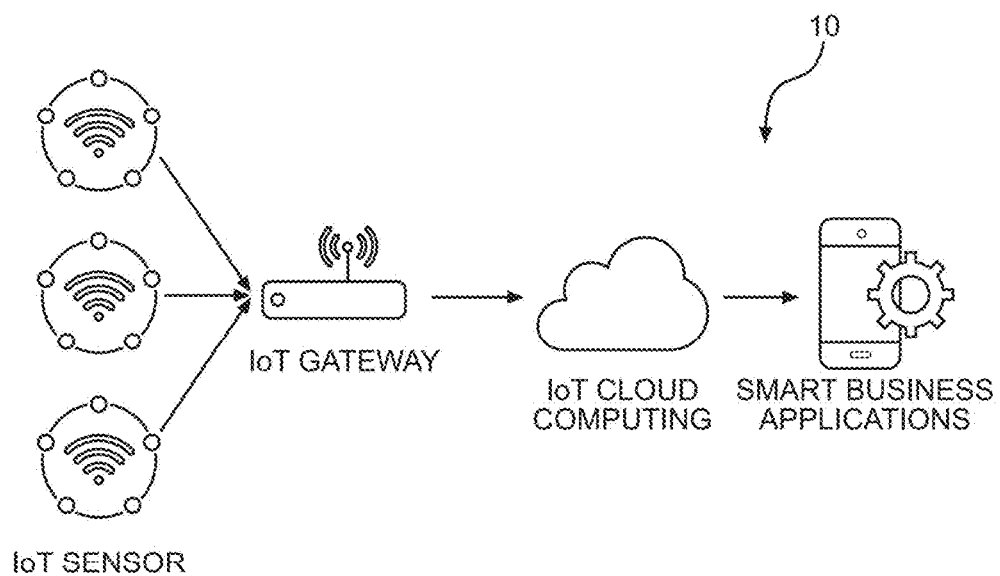

FIG. 1 conceptually illustrates a network architecture diagram of a sensor-based IoT medical instrument use, sterilization, and inventory tracking system in some embodiments.

Figure 2:
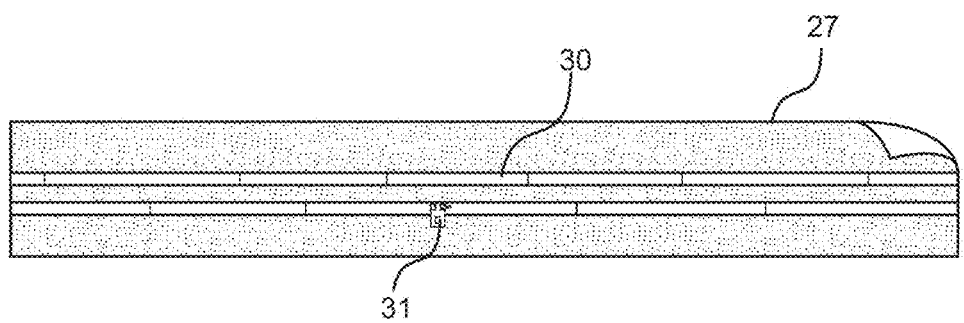

FIG. 2 conceptually illustrates an IoT medical instrument with an antenna and RFID chip which is tracked for usage, sterilization, and inventory by the sensor-based IoT medical instrument use, sterilization, and inventory tracking system in some embodiments.

Figure 3:
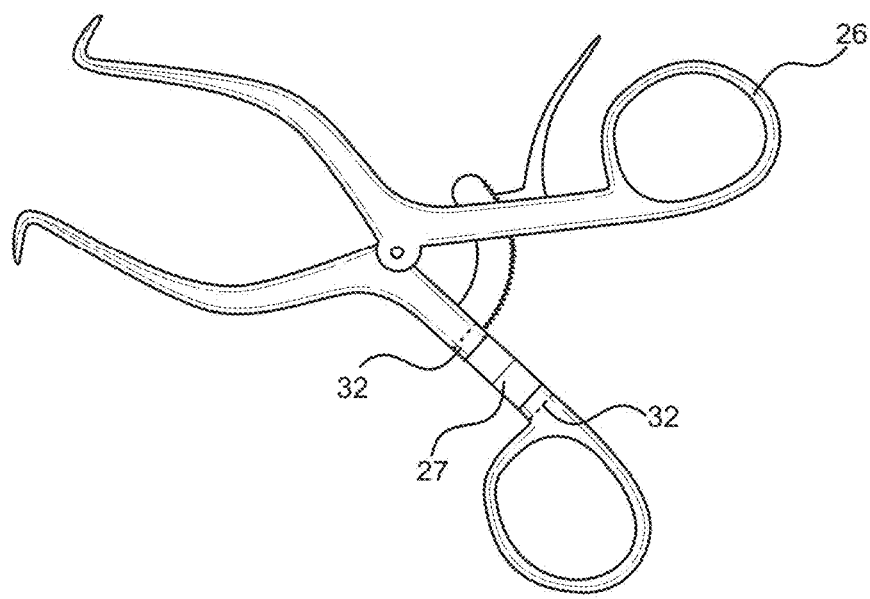

FIG. 3 conceptually illustrates a surgical towel clamp device that incorporates an antenna and RFID chip as an IoT connection device covered by a biocompatible sealant used to protect the IoT connection device for usage, sterilization, and inventory tracking by the sensor-based IoT medical instrument use, sterilization, and inventory tracking system in some embodiments.

Figure 4:
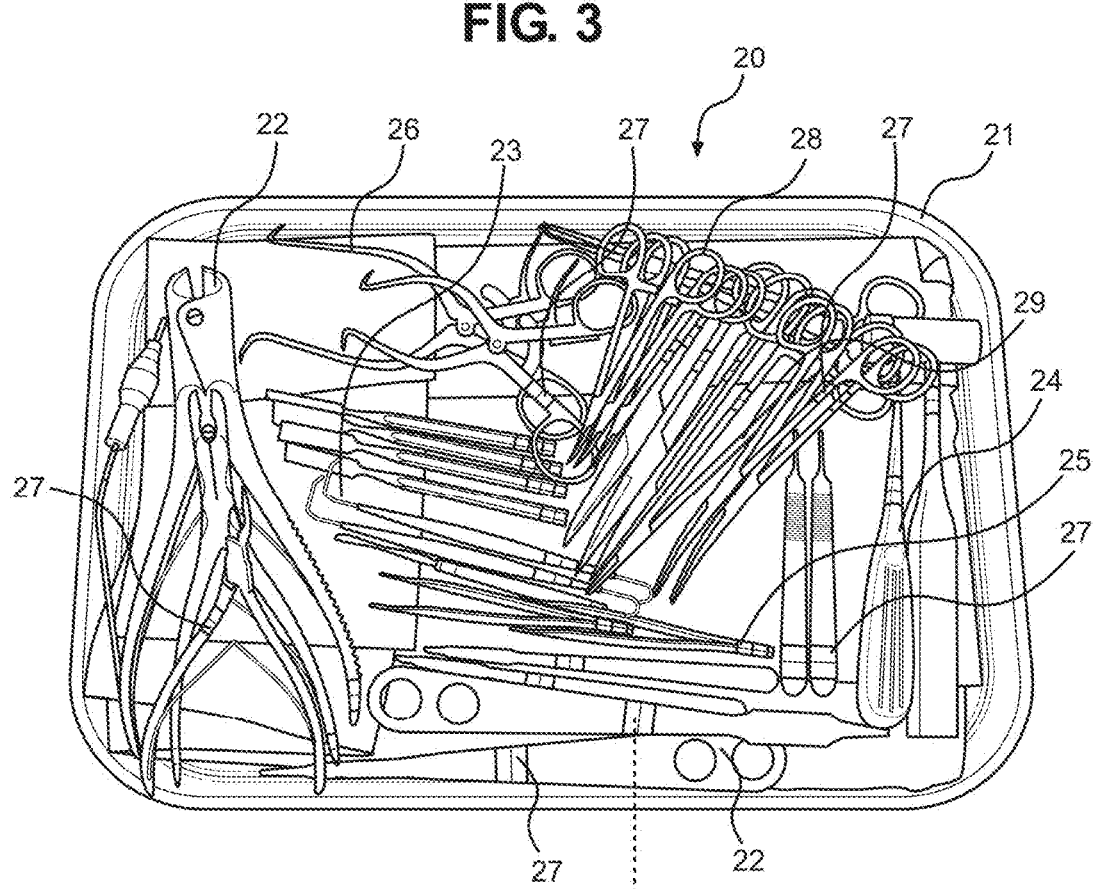

FIG. 4 conceptually illustrates a top view of a surgical tray with several medical tools and instruments in use and being tracked by the sensor-based IoT medical instrument use, sterilization, and inventory tracking system in some embodiments.

FIG. 5 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications. Furthermore, those skilled in the art will recognize that changes in modifications can be made to the exemplary embodiments without departing from the scope of the present disclosure.

As used herein, the terms "comprises," "comprising," "includes," "including" and/or any other variation thereof, are intended to cover a non-exclusive inclusion, such that an article and/or apparatus (such as an IoT connection device) that comprises a list of elements (e.g., an antenna, an RFID chip, etc.) does not include only those elements but can include other elements not expressly listed and/or inherent to such article and/or apparatus. It must also be noted that, as used in this specification and the appended claims, the singular forms "a," "an" and "the" include plural referents unless the content clearly dictates otherwise.

Unless defined otherwise, all technical and medical terms used herein have the same meaning as commonly understood by one of ordinary skill in the art to which the disclosure pertains. Although a number of apparatuses, tools, devices, machines, methods, and/or materials similar or equivalent to those described herein can be used in the practice of the present disclosure, certain preferred apparatuses, tools, devices, machines, methods, and materials are described herein.

The terms "embedded," "encapsulated," "attached," and the like in the description and in the claims, if any, are used for descriptive purposes and not necessarily for describing permanent relative positions or manners of inclusion with respect to any given medical device, tool, or apparatus. For instance, many of the forthcoming descriptions refer to embedded sensors positioned in a medical device or tool (or, generally, the IoT connection device), the position of which is shown in the drawings, but is not intended to limit the embedded positioning of the sensors within said IoT connection device or relative positioning when "attached" to an outer surface of the IoT connection device, or partial embedding and partially exposed externally in regards to the IoT connection device. Thus, it may be understood that the relative positioning shown in the drawings are exemplary and do not intend to limit such placement to only the illustrated positioning. Also, with respect to the terminology used, such as "embedded," "encapsulated," and "attached", among other similar terminology it is to be understood that these terms (and others when and where used in this specification) are interchangeable under appropriate circumstances such that the embodiments described herein are, for example, capable of incorporation of the noted components in other orientations and/or placements (internal, embedded, external, attached, partially exposed, entirely encapsulated (such as by hermetic sealing), mostly encapsulated, etc.) than those illustrated or otherwise described herein.

Embodiments of the invention described in this specification include a novel sensor-based IoT medical instrument use, sterilization, and inventory tracking system that is utilized to track medical device, tool, and apparatus inventory in surgical applications, dental applications, and other medical applications, or other applications outside of the medical and/or dental fields. In some embodiments, the sensor-based IoT medical instrument use, sterilization, and inventory tracking system tracks usage, sterilization, and inventory of surgical medical tools and instruments, dental tools and instruments, and other medical tools and instruments. In some embodiments, the sensor-based IoT medical instrument use, sterilization, and inventory tracking system is connected to a cloud application service with a cloud database to store all tracked usage, sterilization, and inventory data for the medical devices, tools, instruments, and other such medical (or dental) apparatuses.

In some embodiments, the sensor-based IoT medical instrument use, sterilization, and inventory tracking system comprises (i) a plurality of IoT connection devices that attach to medical instruments to track, (ii) an antenna embedded within each IoT connection device, (iii) an RFID chip embedded within each IoT connection device, (iv) a sensor embedded within each IoT connection device, (v) a bio-sealant that hermetically encapsulates the IoT connection device attached to any surgical tool, (vi) a gateway that is communicably connected to the Internet and to which the plurality of IoT connection devices connect to track medical instrument and tool usage, sterilization, and inventory, (vii) a cloud application service that provides a cloud platform for tracking medical instrument and tool usage, sterilization, and inventory, and (viii) a software application that runs on one of a computing device and a mobile device to provide a visual display of tracked information for medical tools and instruments.

Embodiments of the sensor-based IoT medical instrument use, sterilization, and inventory tracking system described in this specification solve the manual tracking and inventory problems that exist presently by automatically tracking all surgical/medical/dental/etc. instruments via sensors, networked and synchronized via cloud application to get live views of inventory and data based on each surgery, procedure, usage, etc., and patient.

Embodiments of the sensor-based IoT medical instrument use, sterilization, and inventory tracking system described in this specification differ from and improve upon currently existing options. In particular, there are no current solutions beyond manual inventory tracking in an operating room, dental office, medical office, etc., and this leads to problems in having instruments and tools on hand and available for surgeries and procedures, as well as questions as to sterilization, and inventory as may arise by human error. By contrast, the sensor-based IoT medical instrument use, sterilization, and inventory tracking system of the present disclosure augments the experience by creating a digital inventory of all instruments and automatically tracking instrument usage, sterilization, and inventory by sensor-based IoT connection device.

The sensor-based IoT medical instrument use, sterilization, and inventory tracking system of the present disclosure may be comprised of the following elements. This list of possible constituent elements is intended to be exemplary only and it is not intended that this list be used to limit the sensor-based IoT medical instrument use, sterilization, and inventory tracking system of the present application to just these elements. Persons having ordinary skill in the art relevant to the present disclosure may understand there to be equivalent elements that may be substituted within the present disclosure without changing the essential function or operation of the sensor-based IoT medical instrument use, sterilization, and inventory tracking system.

1. Sensors
2. Gateway
3. Cloud system (cloud server(s), cloud application service (Saas), web site, web server, cloud database(s), etc.)
4. Software application, mobile app, web application at web portal site, etc. (hereinafter "app/web portal")

The various elements of the sensor-based IoT medical instrument use, sterilization, and inventory tracking system of the present disclosure may be related in the following exemplary fashion. It is not intended to limit the scope or nature of the relationships between the various elements and the following examples are presented as illustrative examples only. The sensors (referenced above at '1') will attach to or be embedded within the medical tools. The gateway (referenced above at '2') will connect the sensors to the internet. The gateway is also referred to as the IoT gateway in some embodiments. The cloud system (referenced above at '3') will aggregate data and provide feedback (e.g., visually outputting data and/or imagery for inventory) through the software app, mobile app, web app at the web portal (or "app/web portal" referenced above at '4').

The sensor-based IoT medical instrument use, sterilization, and inventory tracking system of the present disclosure generally works by advanced IoT sensors that are embedded within surgical tools or are added on/attached to the tools to communicate wirelessly to an internet-enabled gateway.

Data will be aggregated in a cloud platform and live data will be provided in a dashboard that can be accessed via app or web portal.

By way of example, FIG. 1 conceptually illustrates a network architecture diagram of a sensor-based IoT medical instrument use, sterilization, and inventory tracking system 10 in some embodiments. As shown, the sensor-based IoT medical instrument use, sterilization, and inventory tracking system 10 includes IoT sensors which attach to or are embedded within medical tools or instruments to be tracked. The sensor-based IoT medical instrument use, sterilization, and inventory tracking system 10 also includes a gateway, to which the IoT sensors connect to track the medical tool/instrument usage, sterilization, and inventory. The gateway is connected over IoT cloud computing network platform that provides cloud server(s), cloud database(s), web site, web applications, etc., to smart business applications that run as software on traditional computing device or mobile devices.

As shown in another example, FIG. 2 conceptually illustrates an IoT medical instrument with an antenna and RFID chip which is tracked for usage, sterilization, and inventory by the sensor-based IoT medical instrument use, sterilization, and inventory tracking system in some embodiments. Specifically, there is an IoT/connection device 27 with an antenna 30 and an RFID chip 31. When attached to a medical tool or instrument, the sensor is able to connect to the gateway (when the gateway is within communicably distance from the device). Attaching the IoT/connection device 27 to a surgical instrument is described further below, by reference to FIG. 3.

To make the sensor-based IoT medical instrument use, sterilization, and inventory tracking system of the present disclosure, a person either embeds sensors within medical tools and instruments as they are made or attaches the sensors to the tools or instruments post-manufacturing of the tools/instruments. Specifically, when adding on or attaching to ready-made tools, a strip with antenna and RFID chip can be manufactured separately and added on by staff. A biosealant can be applied over the IoT/connection device when needed, such as in the case of invasive surgery. Sensors, a gateway, a cloud portal and system hardware are all needed, but varying degrees of in house or off the shelf methods may be utilized to function in aggregate when deployed according to cloud-based systems, such as software-as-a-service ("SaaS") cloud computing architectures, etc.

By way of example, FIG. 3 conceptually illustrates a surgical towel clamp 26 device that incorporates an antenna and an RFID chip in the IoT/connection device 27 covered by a biocompatible sealant 32 used to protect the IoT/connection device 27 for usage, sterilization, and inventory tracking by the sensor-based IoT medical instrument use, sterilization, and inventory tracking system and to protect the human or animal body undergoing surgery.

To use the sensor-based IoT medical instrument use, sterilization, and inventory tracking system of the present disclosure, a person would add sensors, antennas, RFID chips in IoT/connection devices to any/all medical tools or instruments used or intended for use. For example, during a surgery, all surgical instruments that are possibly needed are tracked for use, as well as sterilization and inventory (after the surgery). Then it is possible to utilize these components to track the surgical instruments in an operating room environment.

By way of example, FIG. 4 conceptually illustrates a top view of a surgical tray with several medical tools and instruments in use and being tracked by the sensor-based IoT medical instrument use, sterilization, and inventory tracking system in some embodiments. As shown in this figure, there are several medical/surgical tools and instruments in use 20 on a surgical tool tray 21 including a pin cutter 22, curettes 23, cautery 24, debakey forceps 25, towel clamp 26, and mosquito forceps 29. Each of the medical/surgical tools and instruments have an IoT/connection device 27 attached or have the sensors, antenna, and RFID embedded inside. Even the tray 21 has an IoT/connection device 27 attached so that it can be tracked for use, sterilization, and inventory. In this way, the tracking is automatic and leaves no doubts as to the inventory or on-hand instrumentation that may be needed when surgeries or procedures arise.

In this specification, the terms "software", "application", "mobile app", "app", "program", and the like, are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

By way of example, FIG. 5 conceptually illustrates an electronic system 500 with which some embodiments of the invention are implemented. The electronic system 500 may be a computer, a mobile device, a server, a gateway computing device, a multi-server platform, a cloud platform with one or more server(s), a single board computer (SBC), or any other sort of electronic or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device.

However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include at least the IoT sensors described in this specification, and may optionally include conventional input devices 530, such as alphanumeric keyboards and pointing devices (also called "cursor control devices"). The output devices 535 include display devices and other output destinations. For instance, the output devices 535 include display devices, such as liquid crystal displays (LCD) and organic light emitting diode (OLED) displays, such as those incorporated into the build of smart devices, such as mobile phones and the like. Similarly, conventional output devices 535 are also anticipated and supported including, without limitation, two-dimensional and three-dimensional printers. Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), a network of mixed computers, computing devices, and Internet of Things ("IoT") appliances, devices, and/or smart items ("IoT Cloud Computing" network), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A sensor-based Internet-of-things (IoT) medical instrument use, sterilization, and inventory tracking system comprising:
   a plurality of IoT connection devices that attach to a plurality of medical instruments to track;
   an antenna embedded within each IoT connection device;
   an RFID chip embedded within each IoT connection device and configured to provide identity information of the IoT connection device in which the RFID chip is embedded;
   a sensor embedded within each IoT connection device and connected to the antenna embedded in the IoT connection device to enable wireless connectivity;
   a bio-sealant that hermetically encapsulates the IoT connection device attached to any surgical tool in the plurality of medical instruments to track;
   an IoT cloud computing system comprising a cloud server and a cloud database, wherein the IoT cloud computing system is configured to aggregate sensor data for the plurality of medical instruments and provide usage, sterilization, and inventory feedback data and imagery for visualization by any connecting device operable by a user;
   a cloud application service that is hosted by the cloud server and, when running on the cloud server, provides a cloud platform for tracking medical instrument and tool usage, sterilization, and inventory;
   an IoT gateway that is communicably connected to the IoT cloud computing system over the Internet, wherein the IoT gateway is configured to (i) enable wireless connection from each IoT connection device in the plurality of IoT connection devices to the cloud platform for tracking medical instrument and tool usage, sterilization, and inventory and (ii) connect the sensor embedded within each wirelessly connected IoT connection device to the IoT cloud server and the cloud database of the IoT cloud computing system over the Internet to track usage, sterilization, and inventory of the plurality of medical instruments to which the plurality of IoT connection devices are attached, wherein the cloud server stores the tracked usage, sterilization, and inventory as medical instrument and tool usage, sterilization, and inventory data in the cloud database; and
   a software application that runs on a particular device that is directly connected to the IoT cloud computing system by way of the cloud application service, wherein the software application is configured to (i) access the medical instrument and tool usage, sterilization, and inventory data stored in the cloud database by way of the cloud application service and (ii) provide a visual display of tracked information for medical tools and instruments based on the medical instrument and tool usage, sterilization, and inventory data.

2. The sensor-based IoT medical instrument use, sterilization, and inventory tracking system of claim 1, wherein the particular device comprises a mobile device and the software application that runs on the mobile device comprises a mobile app.

3. The sensor-based IoT medical instrument use, sterilization, and inventory tracking system of claim 1, wherein the particular device comprises a computing device and the software application that runs on the computing device comprises a browser.

4. The sensor-based IoT medical instrument use, sterilization, and inventory tracking system of claim 3 further comprising a web server that is communicably connected to the cloud server.

5. The sensor-based IoT medical instrument use, sterilization, and inventory tracking system of claim 4, wherein the browser connects to the web server and loads a web application served by the web server.

6. The sensor-based IoT medical instrument use, sterilization, and inventory tracking system of claim 5, wherein the web application is configured to track the usage, sterilization, and inventory of the plurality of medical instruments to which the plurality of IoT connection devices are attached.

7. The sensor-based IoT medical instrument use, sterilization, and inventory tracking system of claim 1, wherein the visual display of tracked information for medical tools and instruments is provided in a dashboard view of the software application.

8. The sensor-based IoT medical instrument use, sterilization, and inventory tracking system of claim 7, wherein tracking data received in real-time from the sensor of each IoT connection device is visually output in the dashboard view to provide live tracking of the medical instrument to which the IoT connection device is attached.

9. The sensor-based IoT medical instrument use, sterilization, and inventory tracking system of claim 1, wherein the sensor embedded within each wirelessly connected IoT connection device wirelessly connects to the IoT gateway through the antenna.

10. The sensor-based IoT medical instrument use, sterilization, and inventory tracking system of claim 1, wherein the IoT gateway is within a communicable distance from the plurality of IoT connection devices attached to the plurality of medical instruments to track.

* * * * *